No. 830,398. PATENTED SEPT. 4, 1906.
J. C. WOOD.
TRANSPARENT SCREEN.
APPLICATION FILED MAR. 12, 1906.

WITNESSES.
Dennis Sumby.
C. D. Kesler

INVENTOR.
John C. Wood
By James L. Norris
Atty.

UNITED STATES PATENT OFFICE.

JOHN CREWE WOOD, OF SWINDON, ENGLAND.

TRANSPARENT SCREEN.

No. 830,398.    Specification of Letters Patent.    Patented Sept. 4, 1906.

Application filed March 12, 1906. Serial No. 305,656.

*To all whom it may concern:*

Be it known that I, JOHN CREWE WOOD, solicitor, a subject of the King of Great Britain, residing at 53 Bath road, Swindon, in the county of Wilts, England, have invented certain new and useful Improvements in Transparent Screens, of which the following is a specification.

My invention relates to improvements in transparent screens and windows for motor-cars and other vehicles, and has for its object the prevention of injury to the occupants of such cars and vehicles through pieces of glass striking them if by accident such screens or windows should be broken, the pieces of broken glass in my invention adhering to the screen and not becoming detached.

It also has the following advantages over celluloid screens or windows: It obviates the danger caused by the same catching fire. Celluloid screens soon become scratched and rendered less transparent. My invention prevents this. Celluloid screens are not rigid and are apt to warp and thereby distort the vision.

To the above end my invention consists in providing two sheets of glass between which is fixed or cemented a sheet or film of any transparent adhesive substance or material with sufficient elasticity to prevent splintering when broken and provide an agglutination or hanging together of the parts. For example, I employ a sheet of celluloid between two sheets of glass or a film of a substance such as gelatin or other transparent substance less brittle than glass and not liable to splinter.

In carrying my invention into effect I provide, for example, two sheets of glass, and I fix these by means of a suitable cement, such as "Canada balsam," to a central sheet of transparent celluloid or other similar material having the requisite strength and transparency and sufficiently adhesive—*i. e.*, capable of being made to adhere to the exterior sheets of glass. In this way I provide a transparent combination of materials or "sandwich" of sufficient rigidity, in which the exterior layers of glass provide a hard non-inflammable surface, readily cleaned and not liable to lose its transparency by scratching or loss of polish and in which the inner layer firmly adheres to and supports the exterior layers, so as to reduce their liability to become cracked and prevent portions from breaking away or splintering even should cracking occur.

The following is an example of a method of constructing a screen according to this invention, reference being had to the accompanying drawings, in which—

Figure 1:
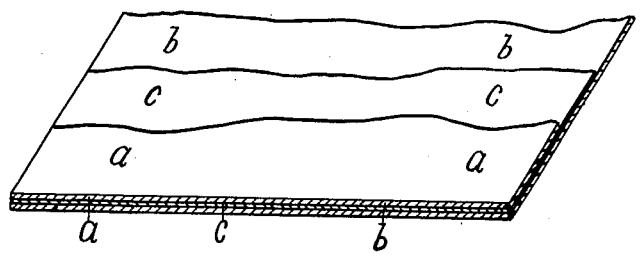
Figure 2:
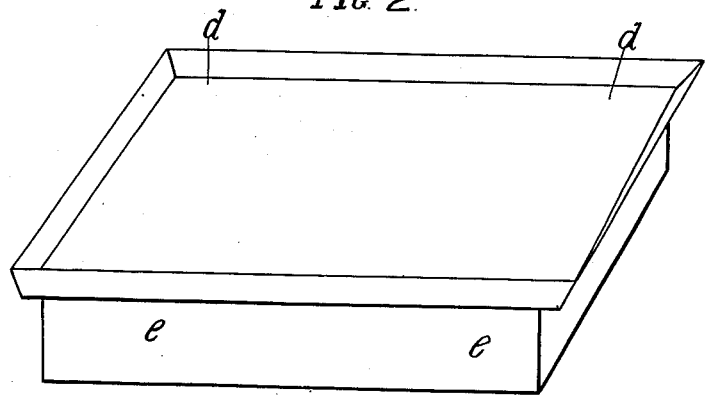

Figure 1 shows in sectional elevation and broken perspective the combination according to this invention of two exterior sheets of glass with an interior sheet of transparent celluloid or the like attached to said exterior sheets by a transparent cement, and Fig. 2 shows in perspective view a tray and hot-water tank suitable for use and in which the sheets of glass and celluloid may be cemented together.

With reference to the drawings, $a$ and $b$ designate the two exterior sheets of glass, and $c$ denotes the interior sheet of celluloid. These exterior glass sheets $a$ and $b$ are cemented by a layer of Canada balsam in sandwich form on either side of the interior sheet of celluloid, and the combined sheets are then employed in the construction of glass screens, windows, and the like for motor-cars and other vehicles.

$d$ designates a tray or bath of about one inch or suitable depth, which I partly fill with liquid Canada balsam. This tray $d$ is adapted to fit and rest on a shallow tank $e$, which tank I fill with hot water for the purpose of heating and thereby reducing the consistency or density of the Canada balsam in the tray $d$ and making it thinner as a liquid. I then take a sheet of plate-glass $b$, (see Fig. 1,) which I have previously warmed, and place it in the tray $d$, submerged in the Canada balsam. I then take a rather larger sheet of transparent clear celluloid $c$ (see Fig. 1) and place it in the tray $d$ over the glass sheet $b$, submerged in the Canada balsam, taking care that no air remains between the glass sheet $b$ and the celluloid sheet $c$. I then take another sheet of plate-glass $a$, having previously warmed the same, and place one edge of such sheet on the celluloid sheet $c$ so that it rests over the corresponding edge of the first sheet of glass $b$. I then lower the second sheet of glass $a$ gradually into the tray $d$ and submerge it in the Canada balsam, so that no air remains between it and the celluloid sheet $c$. The two sheets of glass $a$ and $b$ with the celluloid sheet $c$ are then slightly pressed together in the tray $d$. I then take the combined sheets of glass and celluloid $a$, b, and c out of the tray d and I cut off the edge of the celluloid close to the glass. I mount the combined glass and celluloid sheets in any suitable way—for example, in a frame—placing a rubber packing round the glass where in contact with the frame. The glass is fixed in the frame by an inner frame, which is screwed down upon it in such a way as to have a clamped effect, so as to prevent the sheets of glass and celluloid by any means separating, and the face-surfaces of the screen or window are then cleaned.

The inner layer may be of any material providing the requisite degree of transparency and strength and capable of adhering (either of its own nature or through the interposition of a suitable cement) to the exterior layers of glass.

It will be understood that my improved screen may be used for other analogous purposes when a sufficiently rigid transparent screen is required capable of resisting fracture and not liable to splinter or break up without departing from the scope of this invention.

What I claim as my invention, and desire to secure by Letters Patent, is—

1. An article of manufacture, composed of exterior transparent sheets of material, an intermediate flexible transparent substance, and a transparent medium interposed between the several sheets for rigidly connecting the same.

2. A transparent screen composed of two exterior sheets of glass, an interior transparent sheet of celluloid, and a transparent cement for attaching the exterior sheets of glass to the interior sheet of celluloid.

In testimony whereof I have hereunto set my hand in presence of two subscribing witnesses.

JOHN CREWE WOOD.

Witnesses:
RICHARD JAMES,
CHARLES SCHAEFER RUTLIDGE.